US012136885B2

United States Patent
Yang et al.

(10) Patent No.: US 12,136,885 B2
(45) Date of Patent: Nov. 5, 2024

(54) RESONANT HALF-BRIDGE FLYBACK POWER CONVERTER WITH SKIPPING CYCLES AND CONTROL METHOD THEREOF

(71) Applicant: Richtek Technology Corporation, Zhubei (TW)

(72) Inventors: Ta-Yung Yang, Taoyuan (TW); Ying-Chieh Su, Taipei (TW); Yu-Chang Chen, Nantou (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 18/436,023

(22) Filed: Feb. 8, 2024

(65) Prior Publication Data

US 2024/0223093 A1 Jul. 4, 2024

Related U.S. Application Data

(62) Division of application No. 17/673,062, filed on Feb. 16, 2022.

(60) Provisional application No. 63/230,419, filed on Aug. 6, 2021, provisional application No. 63/231,806, filed on Aug. 11, 2021, provisional application No. 63/153,398, filed on Feb. 25, 2021, provisional application No. 63/241,090, filed on Sep. 6, 2021.

(51) Int. Cl.
*H02M 3/335* (2006.01)
*H02M 1/00* (2007.01)
*H02M 1/08* (2006.01)

(52) U.S. Cl.
CPC ..... *H02M 3/33571* (2021.05); *H02M 1/0058* (2021.05); *H02M 1/083* (2013.01); *H02M 3/33592* (2013.01); *H02M 1/0009* (2021.05)

(58) Field of Classification Search
CPC .......... H02M 1/0058; H02M 3/33571
See application file for complete search history.

(56) References Cited

U.S. PATENT DOCUMENTS 10,892,687 B2   1/2021   Fahlenkamp et al.
2019/0036442 A1*  1/2019   Oh ................... H02M 3/33592

FOREIGN PATENT DOCUMENTS

CN   107453610 A   * 12/2017   .............. H02M 1/34

* cited by examiner

*Primary Examiner* — Gary A Nash
(74) *Attorney, Agent, or Firm* — Tung & Associates

(57) ABSTRACT

A resonant half-bridge flyback power converter includes: a first transistor and a second transistor which form a half-bridge circuit; a transformer and a resonant capacitor connected in series and coupled to the half-bridge circuit; and a switching control circuit configured to generate a first driving signal and a second driving signal to control the first transistor and the second transistor respectively for switching the transformer to generate an output voltage. The first driving signal is configured to magnetize the transformer. The second driving signal includes at most one pulse between two consecutive pulses of the first driving signal. The switching control circuit generates a skipping cycle period when an output power is lower than a predetermined threshold. A resonant pulse of the second driving signal is skipped during the skipping cycle period. The skipping cycle period is increased in response to the decrease of the output power.

13 Claims, 13 Drawing Sheets

RESONANT HALF-BRIDGE FLYBACK POWER CONVERTER WITH SKIPPING CYCLES AND CONTROL METHOD THEREOF

CROSS REFERENCE

This is a divisional application of Ser. No. 17/673,062, filed on Feb. 16, 2022, which claims priority to following provisional applications, Ser. No. 63/230,419, filed on Aug. 6, 2021; provisional applications Ser. No. 63/231,806, filed on Aug. 11, 2021; provisional applications Ser. No. 63/153, 398, filed on Feb. 25, 2021; provisional applications Ser. No. 63/241,090, filed on Sep. 6, 2021, all of which applications are incorporated herein by their reference in their entirety.

BACKGROUND OF THE INVENTION

Field of Invention

The present invention relates to a flyback power converter; particularly, it relates to a resonant half-bridge flyback power converter with skipping cycles. The present invention also relates to a control method controlling resonant half-bridge flyback power converter.

Description of Related Art

FIG. 1 shows a prior art of US patent U.S. Pat. No. 5,959,850 "Asymmetrical Duty Cycle Flyback Converter", which discloses a half-bridge flyback power converter with zero voltage switching (ZVS) for achieving the higher power efficiency. The ZVS can be defined as the transistor is switched on when the voltage across the transistor (e.g. drain-source voltage) is zero or close to zero. However, the drawback of this prior art is that the power efficiency during the light load of the power converter is low.

Another drawback of this prior art is the output voltage of the power converter cannot be variable. More specifically, a ZVS flyback power converter with the variable output voltage requires to detect the demagnetized time of the transformer for controlling the switching of the transformer.

Another prior art of U.S. Pat. No. 7,151,681 "Multiple-sampling circuit for measuring reflected voltage and discharge time of a transformer" shows a method to detect the output voltage and the demagnetized time of the transformer. However, this prior art power converter cannot achieve ZVS. It was developed for the DCM (discontinuous conduction mode) operation.

FIG. 2 shows waveforms of a prior art half-bridge power converter operating at DCM (discontinuous conduction mode) during the light load condition. A driving signal SH is coupled to drive a high-side switch of the half-bridge power converter for magnetizing the transformer. A driving signal SL is applied to drive a low-side switch of the half-bridge power converter. The magnetizing current IM shows the transformer operates in DCM. When the output power of the half-bridge power converter is decreased, the pulse width TW of the driving signal SH decreases in response to the feedback control of the half-bridge power converter. The pulse width of the driving signal SL also decreases accordingly. Therefore, the switching frequency of the half-bridge power converter increases, and the switching loss increases when the output power is decreased. After the driving signal SH turns to low (off), the first pulse of the driving signal SL is enabled during the demagnetizing period of the transformer. A second pulse of the driving signal SL is enabled to generate a circulated current for achieving ZVS of the high-side switch.

A drawback of this prior art is the driving signal SL thus toggles on/off twice during a switching cycle when operating in DCM, which further increases the average switching frequency of the driving signal SL and causes a significant switching loss and the heat at the low-side switch.

Compared to the prior art U.S. Pat. No. 7,151,681, the present invention provides a resonant half-bridge flyback power converter with skipping cycle to improve power efficiency for both the middle load and the light load operations.

Compared to the prior art U.S. Pat. No. 5,959,850, the present invention provides a method and a switching control circuit for generating a demagnetized signal, wherein the period of this demagnetized signal is equal to the demagnetized period of the transformer. It can be applied to the ZVS flyback power converter with programmable output voltage, such as the USB PD power converters.

Compared to the prior art shown in FIG. 2, the present invention provides a control circuit for the asymmetrical half-bridge (AHB) flyback power converter with three transistors to improve the power efficiency for both the middle load and the light load operations.

SUMMARY OF THE INVENTION

From one perspective, the present invention provides a resonant half-bridge flyback power converter comprising: a first transistor and a second transistor which are configured to form a half-bridge circuit; a transformer and a resonant capacitor which are connected in series and are coupled to the half-bridge circuit; and a switching control circuit configured to operably generate a first driving signal and a second driving signal to control the first transistor and the second transistor respectively for switching the transformer to generate an output voltage; wherein the first driving signal is configured to magnetize the transformer; wherein the second driving signal includes at most one pulse between two consecutive pulses of the first driving signal, wherein the at most one pulse of the second driving signal includes either a resonant pulse for operating a resonant cycle after the transformer is magnetized or a ZVS (zero voltage switching) pulse for achieving ZVS of the first transistor; wherein the switching control circuit includes a timer configured to operably generate a skipping cycle period when an output power corresponding to the output voltage is lower than a predetermined threshold; wherein a resonant pulse of the second driving signal is skipped during the skipping cycle period; wherein the skipping cycle period is increased in response to the decrease of the output power.

In one preferred embodiment, the second driving signal does not include a second pulse for achieving ZVS of the first transistor between two consecutive pulses of the first driving signal.

In one preferred embodiment, each of the first driving signal and the second driving signal includes zero pulses during the skipping cycle period.

In one preferred embodiment, a period of the resonant pulse of the second driving signal is equal to or longer than a demagnetizing period of the transformer.

In one preferred embodiment, a portion of a demagnetized current of the transformer flows through a body diode of the second transistor after turning off the first transistor during the skipping cycle period.

In one preferred embodiment, the first driving signal includes at most one pulse between two consecutive pulses of the second driving signal.

In one preferred embodiment, each pulse of the second driving signal is followed by a pulse of the first driving signal.

In one preferred embodiment, the second transistor is turned on for a ZVS pulse after the skipping cycle period for achieving ZVS of the first transistor.

In one preferred embodiment, the skipping cycle period is started from a turn-off time point of the first driving signal when the output power is lower than the predetermined threshold.

In one preferred embodiment, the skipping cycle period is started from a turn-off time point of the first driving signal, and the second driving signal turns on a ZVS pulse when the skipping cycle period is expired.

In one preferred embodiment, the resonant cycle further includes an extended ZVS period for achieving ZVS of the first transistor.

From another perspective, the present invention provides a control method for controlling a resonant half-bridge flyback power converter, wherein the resonant half-bridge flyback power converter includes a first transistor and a second transistor which are configured to form a half-bridge circuit; and a transformer and a resonant capacitor which are connected in series and are coupled to the half-bridge circuit; the resonant half-bridge flyback power converter comprising: switching the transformer with periodical switching cycles to generate an output voltage by switching the half-bridge circuit; generating a skipping cycle period when an output power corresponding to the output voltage is lower than a predetermined threshold; wherein the switch-on of the first transistor magnetizes the transformer; the switch-on of the second transistor achieves a resonant cycle or achieves ZVS for the first transistor; wherein a resonant pulse of the second driving signal is skipped during the skipping cycle period; wherein the skipping cycle period is increased in response to the decrease of the output power.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
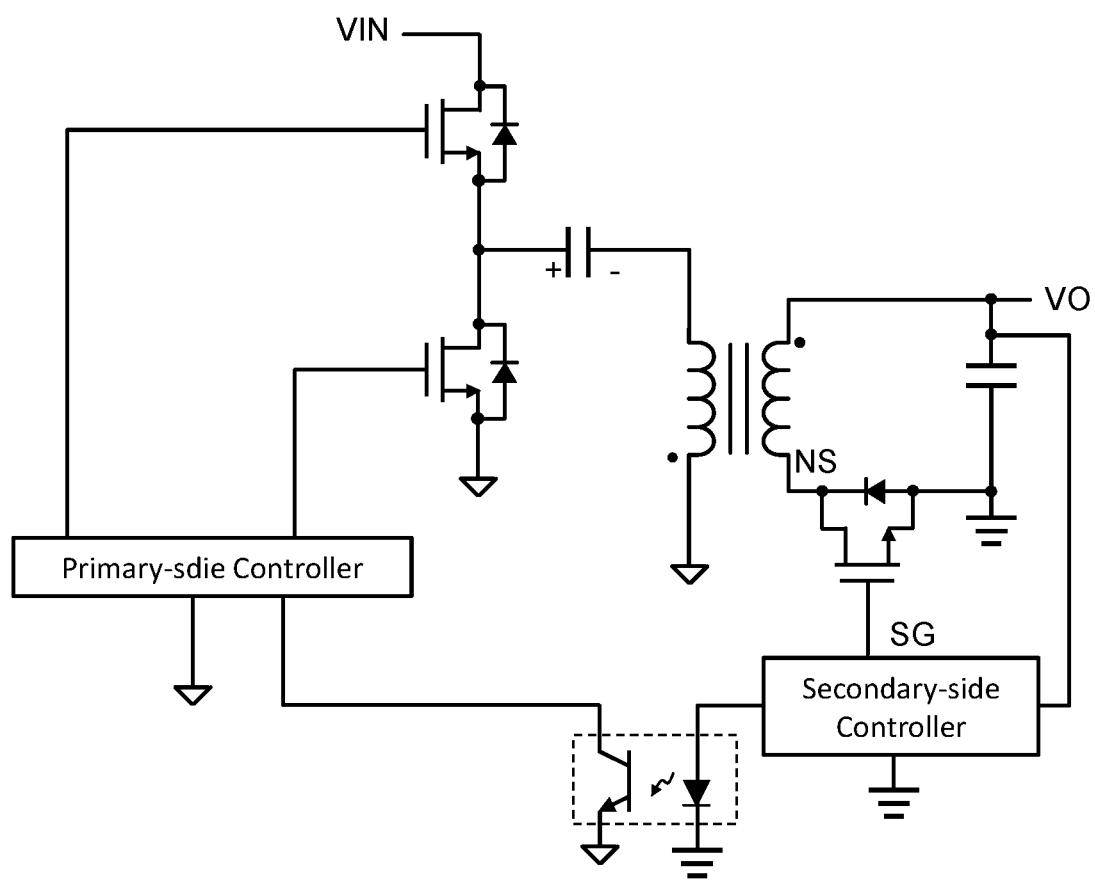
FIG. 1 shows a prior art flyback converter.
Figure 2:
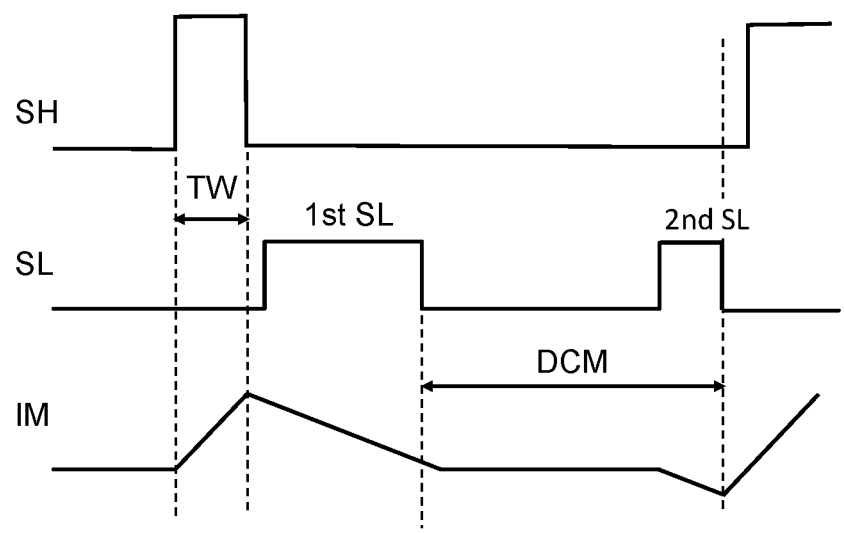
FIG. 2 shows waveforms of a prior art half-bridge power converter operating at DCM (discontinuous conduction mode) during the light load condition.
Figure 3:
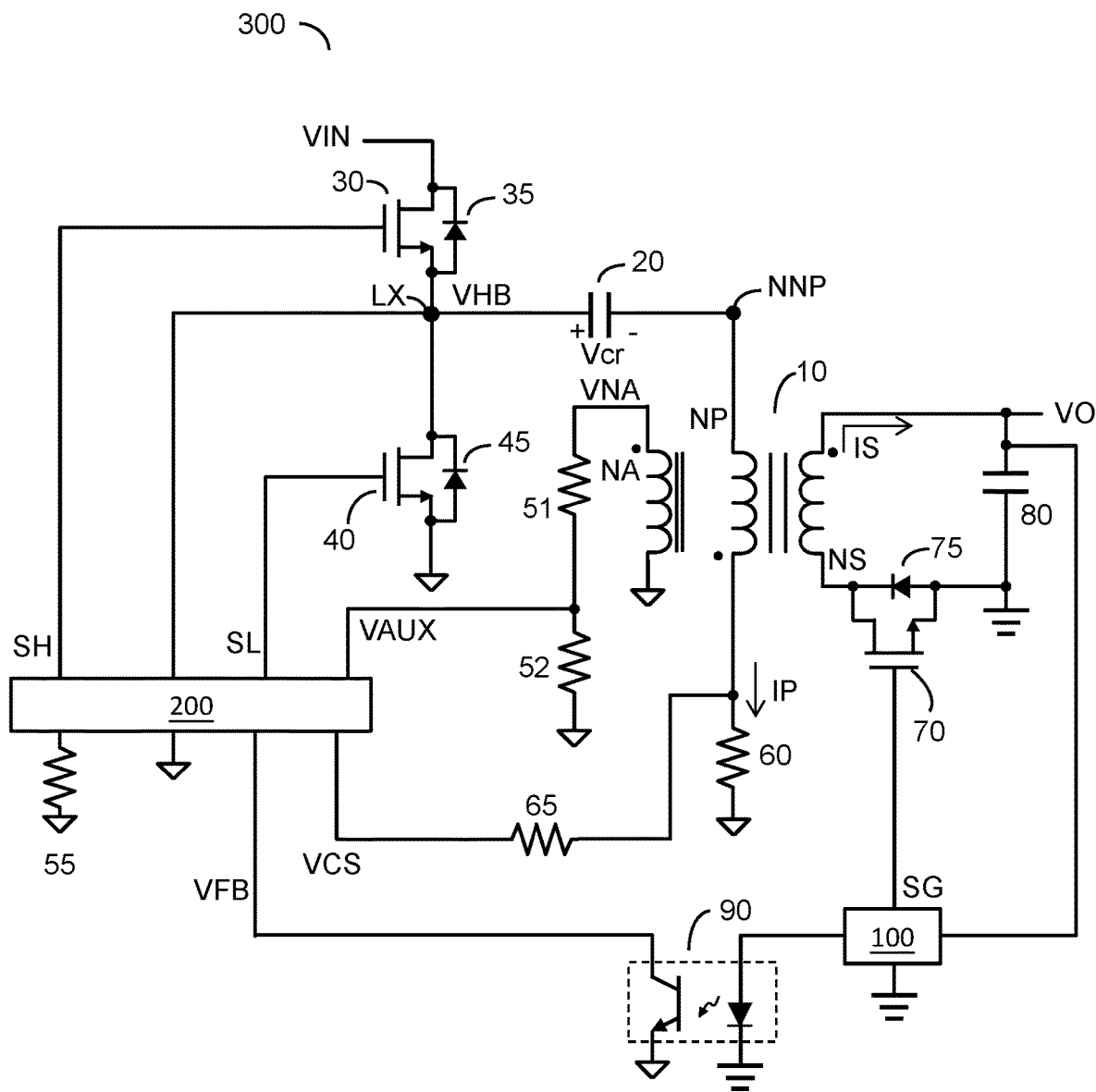
FIG. 3 shows schematic diagram of a preferred embodiment of a resonant half-bridge flyback power converter according to the present invention.

FIG. 3 shows schematic diagram of a preferred embodiment of a resonant half-bridge flyback power converter according to the present invention. The resonant half-bridge flyback power converter 300 includes a first transistor 30 and a second transistor 40 which form a half-bridge circuit. A transformer 10 and a resonant capacitor 20 connected in series is coupled to the switching node LX of the half-bridge circuit. The transformer 10 includes a primary winding NP, a secondary winding NS and an auxiliary winding NA. The primary winding NP and the secondary winding NS has a turn ratio n. The secondary winding NS and the auxiliary winding NA has a turn ratio m. A primary-side controller 200 generates a driving signal SH and a driving signal SL coupled to switch the transformer 10 through the half-bridge circuit for generating an output voltage VO at the secondary-side of the transformer 10. The driving signal SH drives the first transistor 30 to magnetize the transformer 10. The driving signal SL turns on the second transistor 40 during demagnetizing and the resonant period of the transformer 10. The driving signal SL also is applied to turn on the second transistor 40 for generating a circulating current through the transformer 10 and achieving ZVS for the first transistor 30. A resistor 60 is coupled to generate a current sense signal VCS by detecting a primary switching current IP of the power transformer 10.

The driving signal SH and the driving signal SL are generated in response to a feedback signal VFB according to the output power of the resonant half-bridge flyback power converter 300. A secondary controller 100 is coupled to the output voltage VO for generating the feedback signal VFB. The feedback signal VFB is further coupled to the primary-side controller 200 through an opto-coupler 90. The secondary controller 100 also generates a driving signal SG for driving the synchronous rectifier 70 during the demagnetizing period TDS of the transformer 10. The auxiliary winding NA generates an auxiliary winding signal during the switching of the transformer 10. Resistors 51, 52 further attenuate the auxiliary winding signal VNA for producing an auxiliary signal VAUX connected to the primary-side controller 200. In one embodiment, a resistor 55 connected to the primary-side controller 200 is applied to set the parameter for generating a demagnetized signal Sdmg.

Figure 4:
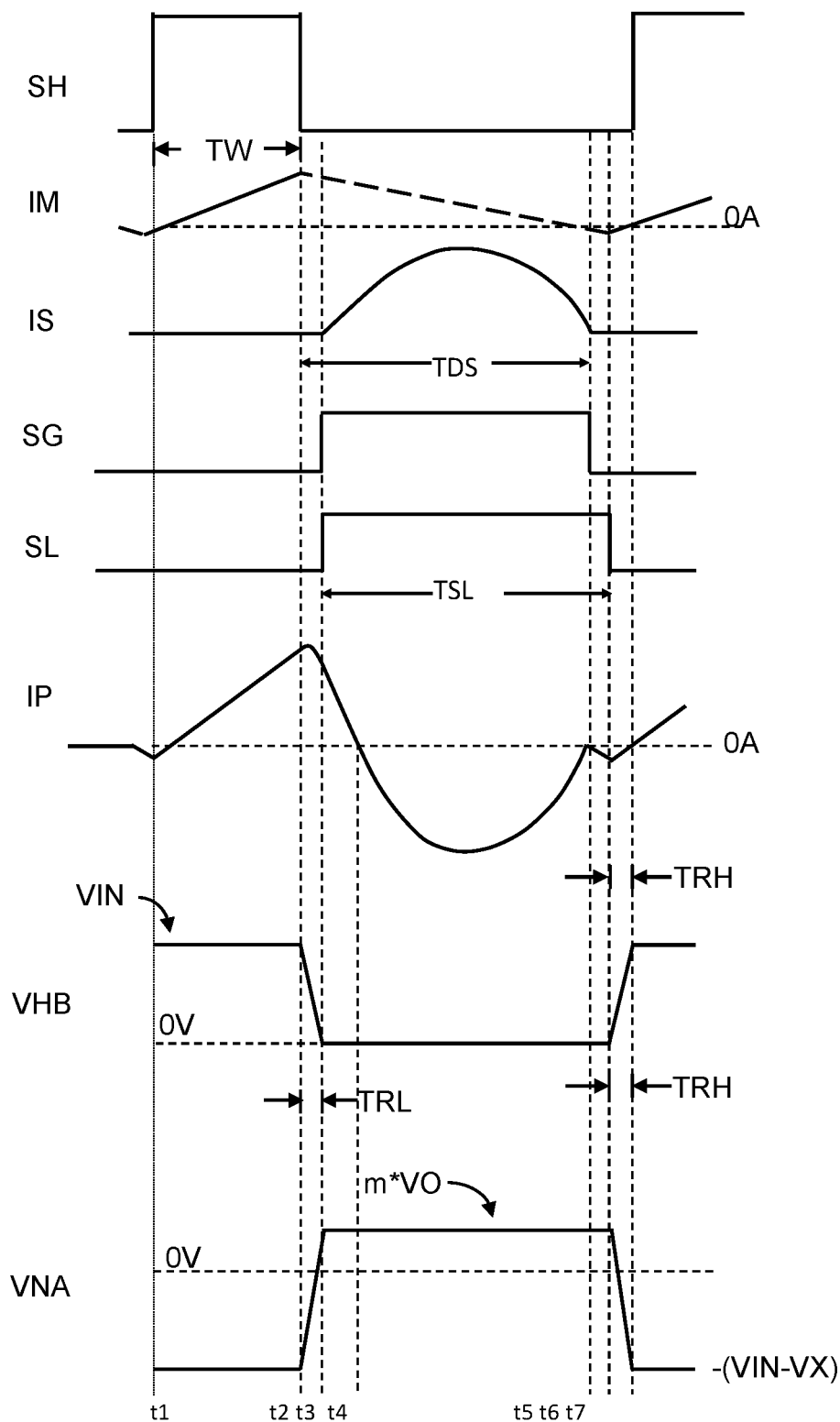
FIG. 4 shows operating waveforms corresponding to the embodiment shown in FIG. 3.

FIG. 4 shows operating waveforms corresponding to the embodiment shown in FIG. 3. The transformer 10 is magnetized and a magnetizing current IM is generated when the driving signal SH is turned on. The transformer 10 is demagnetized when the driving signal SH is turned off. The transformer 10 generates a secondary switching current IS during the demagnetizing period TDS. The period of the driving signal SL is related to the demagnetizing period TDS of the transformer 10. In one embodiment, the period TSL (i.e. the pulse width) of the driving signal SL is configured to be equal to or longer than the demagnetizing period TDS of the transformer 10 to prevent the transformer 10 from operating in continuous conduction mode (CCM). A reflected voltage VX is generated in the resonant capacitor 20 during the demagnetizing period TDS of the transformer 10, wherein VX=n*VO.

The driving signal SL can be turned on when the driving signal SH is turned off. The driving signal SH can be turned on when the driving signal SL is turned off. Dead time periods (e.g. TRH and TRL) can be included in between the driving signal SH and the driving signal SL.

Operations during different time periods shown in FIG. 4 are explained in the following sections.

The period from t1 to t2 indicates a magnetized transformer cycle. The first transistor 30 is on and the second transistor 40 is off. The current IP increases in the transformer 10 and the voltage in the resonant capacitor 20 increases. The transformer 10 is magnetized and the resonant capacitor 20 is charged. The secondary synchronous rectifier 70 is off and the body diode 75 of the secondary synchronous rectifier 70 is biased inversely. Hence no energy is transferred to the secondary side.

The period from t2 to t3 indicates a first circulated current cycle. Both the first transistor 30 and the second transistor 40 are off. The circulated current of the transformer 10 will force the switching node voltage VHB of the half-bridge circuit to drop until the body diode 45 of the second transistor 40 is turned on. The time period from t2 to t3 is related to a quasi-resonant period for achieving ZVS of the second transistor 40. The primary side of the transformer 10 now has the same voltage as the resonant capacitor 20 at t3.

The period from t3 to t4 indicates a resonant cycle (positive current). The first transistor 30 is off and the second transistor 40 is turned on under the ZVS condition. The output voltage VO equals to the voltage Vcr across the resonant capacitor 20 divided by the turn ratio n. The current starts flowing through the secondary synchronous rectifier 70, the energy stored in the transformer 10 is transferred to the output to generate the output voltage VO. Because the LC tank is formed by the leakage inductance Lr of the transformer 10 and the resonant capacitor 20 (Cr), the secondary current follows a sine-wave with the period determined by the resonant frequency of Lr and Cr. The current in the primary side of the transformer 10 is the sum of the magnetizing current IM plus the reflected secondary current IS. The current in the resonant tank (Lr, Cr) is still positive, mainly driven from the magnetizing inductance of the transformer 10, and flows into the resonant capacitor 20.

The period from t4 to t5 indicates a resonant cycle (negative current). The first transistor 30 is off and the second transistor 40 is turned on continuously. The energy is still being transferred to the secondary side, but the resonant tank current inversely driven by the voltage in the resonant capacitor 20. The energy of the resonant capacitor 20 is not only transferred to the secondary side, but also utilized to bring the magnetizing current of the transformer 10 to a negative level when the second transistor 40 is continuously turned on (e.g. t4-t5).

The period from t5 to t6 indicates a backward magnetized transformer cycle (negative current). The backward magnetized transformer cycle is started from the end of demagnetizing period TDS of the transformer 10 to the second transistor 40 is off. The resonant capacitor 20 will inversely magnetize the transformer 10 and generate the negative current.

The period from t6 to t7 indicates a second circulated current cycle. Both the first transistor 30 and the second transistor 40 are off. The negative current induced in the transformer 10 during t5 to t6 forces the voltage VHB at the switching node LX of the half-bridge circuit to increase until it turns on the body diode 35 of the first transistor 30.

After the time point t7, another cycle starts similar with t1 to t2, wherein the first transistor 30 is turned on with the ZVS condition and the second transistor 40 is off. If the circulated current in the transformer resonant tank is still negative, the excess of energy in the tank will be sent back to the input VIN.

Under light load conditions, the pulse width of the driving signal SH and the driving signal SL are decreased in response to the decrease of the output power. The switching frequency of the driving signal SH and the driving signal SL are thus increased in the light load condition. Therefore, the power efficiency of the power converter becomes poor because the power losses such as the core loss, the switching loss, etc. are increased.

Figure 5:
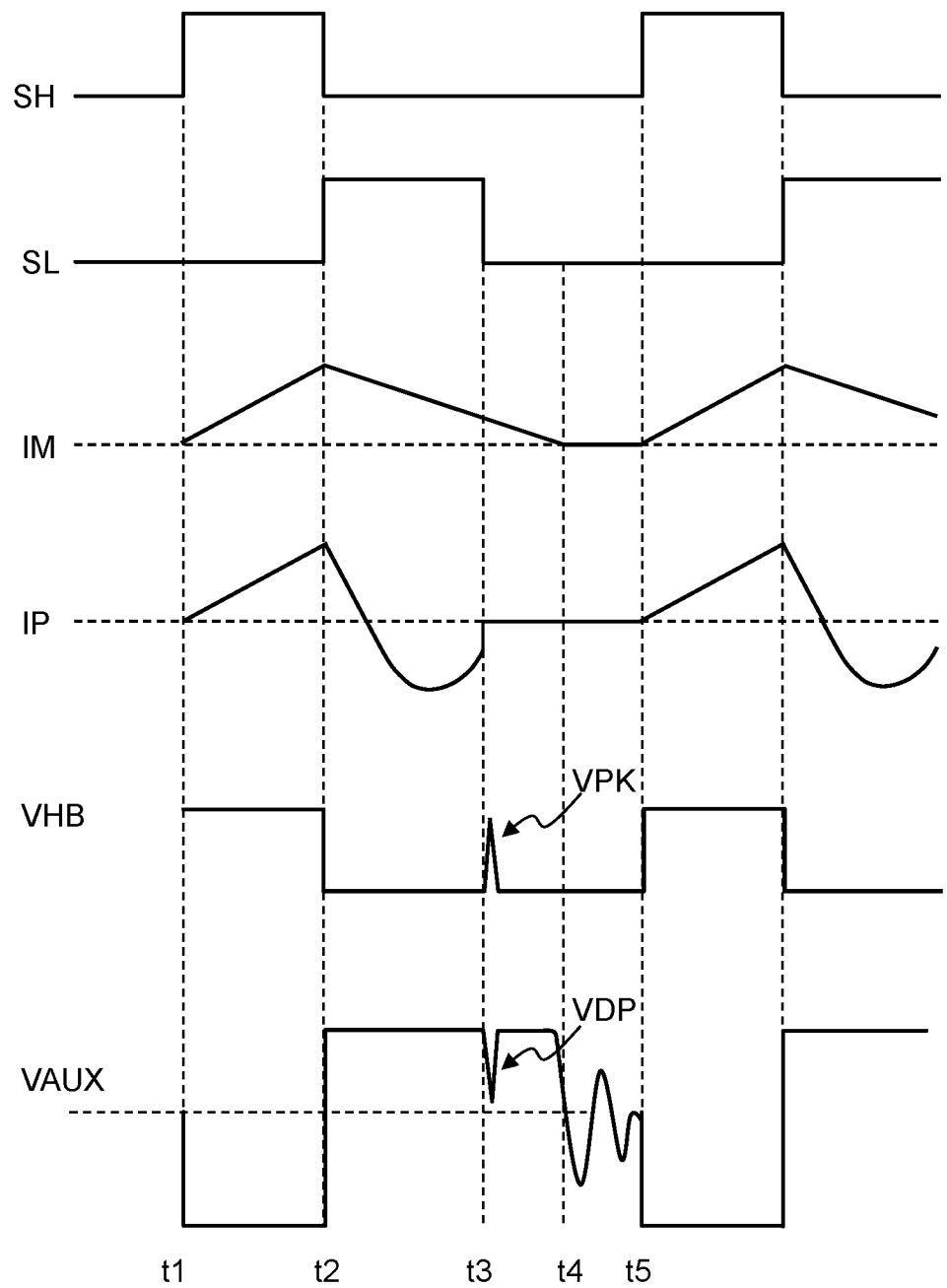
FIG. 5 shows waveforms of decreasing the switching frequency of the driving signals.

FIG. 5 shows waveforms of decreasing the switching frequency of the driving signal SH and the driving signal SL. Reducing the switching frequency by extending the period in between the turn-off of the driving signal SL (e.g. t3) to the turn-on of the driving signal SH (e.g. t5) is a solution to improve the power efficiency. However, the turn-off of the driving signal SL will generate the circulating current that causes a voltage spike VPK at the switching node voltage VHB and a voltage drop VDP at the auxiliary signal VAUX. The voltage spike VPK and the voltage drop VDP cause the power loss and noise.

Note that the aforementioned turn-on or turn-off of the driving signal SH or the driving signal SL indicates the states of correspondingly turning on or turning off the first transistor 30 or the second transistor 40 respectively.

Figure 6:
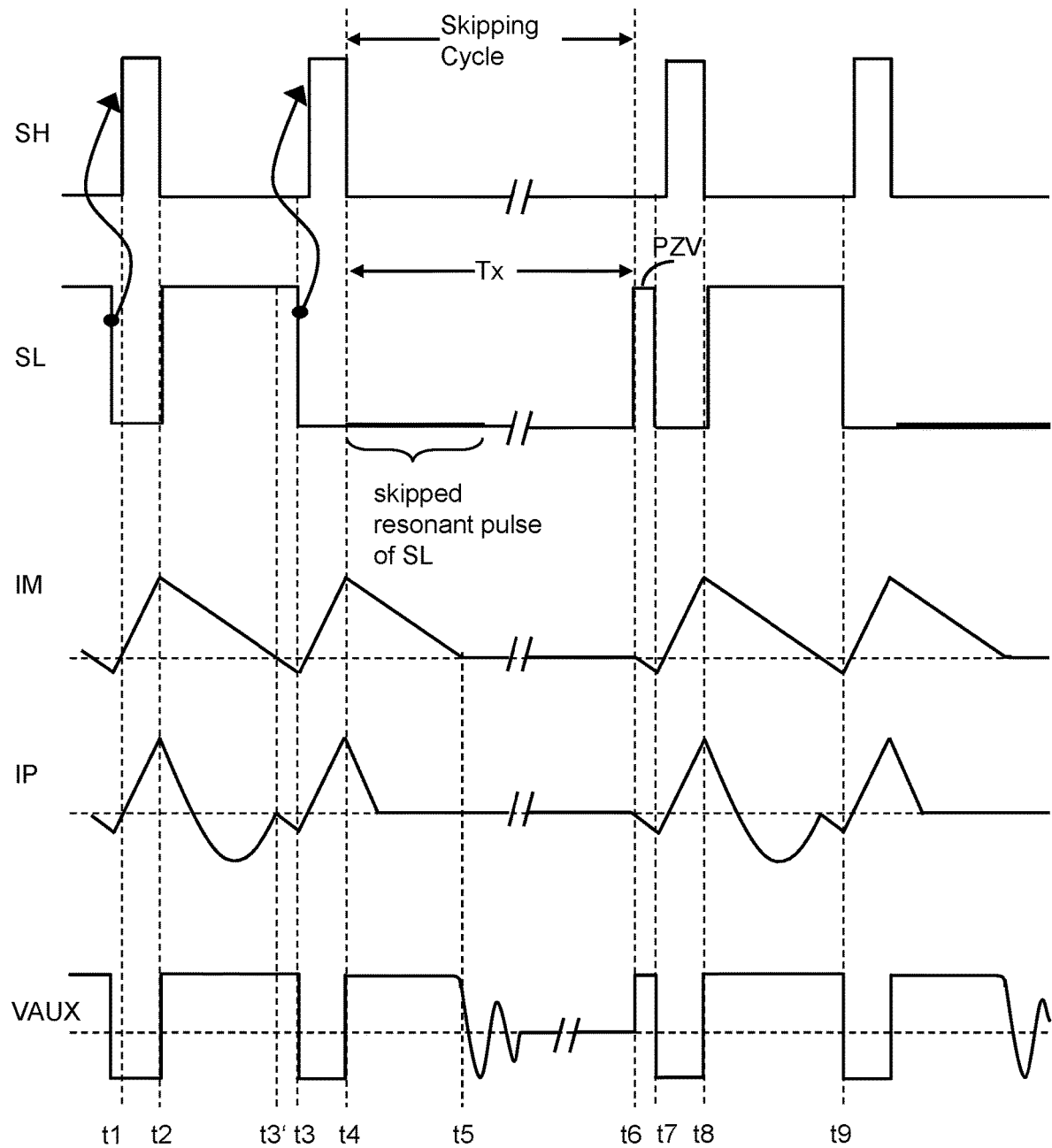
FIG. 6 shows operating waveforms of one embodiment of the resonant half-bridge flyback power converter with skipping cycle according to the present invention.

FIG. 6 shows operating waveforms of one embodiment of the resonant half-bridge flyback power converter with skipping cycle according to the present invention.

Referring to FIG. 6, in one embodiment, the first driving signal SH turns on during the magnetizing cycle (e.g. t1-t2) to magnetize the transformer 10. The driving signal SL turns on with a resonant pulse (e.g. t2-t3) following the turn-off of the first driving signal SH during the resonant cycle (e.g. t2-t3). One magnetizing cycle and one resonant cycle form a switching cycle (e.g. t1-t3).

Referring to FIG. 6, in one embodiment, a skipping cycle period Tx is started at the turn-off of the driving signal SH (e.g. t4), and the driving signal SL will turn on once the skipping cycle period Tx is expired (e.g. t6). In one embodiment, the period of the skipping cycle period Tx will be increased (i.e. the switching frequency is decreased) in response to the decrease of the output power for power saving.

Still referring to FIG. 6, compared to the cycle without skipping, e.g. t1 to t3, the driving signal SL is not turned on for a resonant pulse in the skipping cycle (e.g. during Tx). For example, a pulse which could have existed from t4 to t5 of the driving signal SL in prior art, i.e. the resonant pulse of SL, is skipped in this embodiment, as noted in FIG. 6. Therefore, no negative circulating current will be generated in the skipping cycle period (t4-t6). The voltage spike VPK generated at the switching node voltage VHB and the voltage drop VDP generated at the auxiliary signal VAUX in the aforementioned prior art can be avoided. In one embodiment, as shown in FIG. 6, the driving signal SH is not turned on in the skipping cycle (e.g. during Tx), either.

In one embodiment, after the turn-off of the driving signal SH, a portion of the demagnetized current of the transformer 10 flows through the body diode 45 of the second transistor 40 during some portion of the skipping cycle period (e.g. during some portion between t4-t5). In other words, in one embodiment, there are no double pulses generated in the driving signal SL. In one embodiment, there are no double pulses generated in the driving signal SH, either. From one perspective, it will be one pulse of the driving signal SH followed by one pulse of the driving signal SL, and one pulse of the driving signal SL followed by one pulse of the driving signal SH, even when the resonant half-bridge flyback power converter is operated with a skipping cycle. From another perspective, the driving signal SL includes at most one pulse between two consecutive pulses of the driving signal SH, and the driving signal SH includes at most one pulse between two consecutive pulses of the driving signal SL.

In one embodiment, the skipping cycle period Tx is generated when the output power is lower than a predetermined threshold. In one embodiment, the skipping cycle period Tx is increased in response to the decrease of the output power. In one embodiment, the second driving signal does not include a second pulse for achieving ZVS of the first transistor 30 between two consecutive pulses of the first driving signal, even if the driving signal SL cannot achieve zero voltage switching for the first transistor 30.

Still referring to FIG. 6, in one embodiment, a ZVS pulse (e.g. PZV) of the driving signal SL will turn on the second transistor 40 for achieving the ZVS cycle (e.g. t6-t7) after the skipping cycle.

As shown in FIG. 6, in one embodiment, at least one switching cycle (e.g. t7-t9) starts after the skipping cycle period, following the ZVS pulse PZV.

Still referring to FIG. 6, in one embodiment, a resonant cycle can include an extended ZVS period (e.g. t3'-t3) for achieving ZVS of the first transistor 30. In other words, in this embodiment, a first portion of the resonant pulse (e.g. t2-t3') achieves the resonance of the transformer 10 and the resonant capacitor 20, and the second portion of the resonant pulse (e.g. t3'-t3) generates a circulated current for achieving the ZVS of the first transistor 30.

Figure 7:
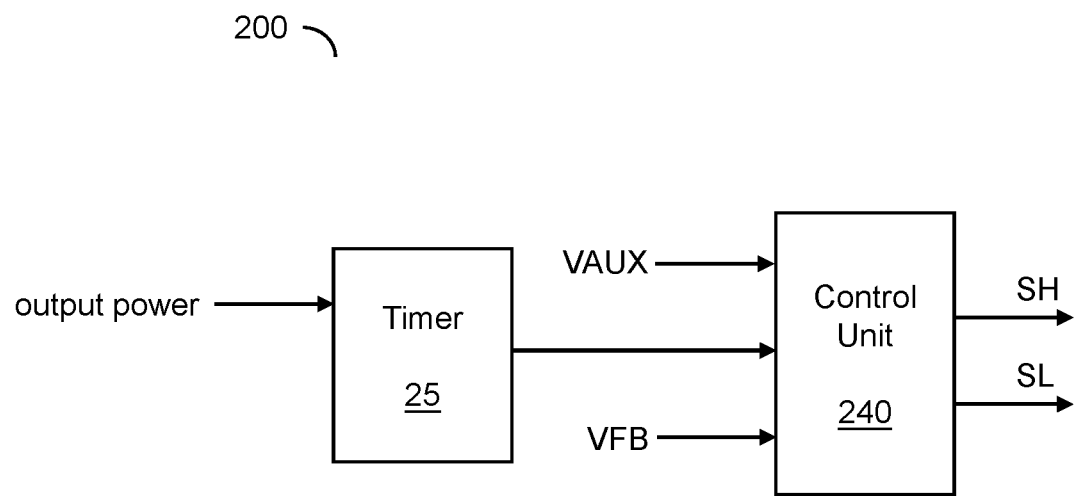
FIG. 7 shows a block diagram of one embodiment of the primary-side controller of the resonant half-bridge flyback power converter according to the present invention.

FIG. 7 shows a block diagram of one embodiment of the primary-side controller of the resonant half-bridge flyback power converter according to the present invention. In one embodiment, the primary-side controller 200 includes a timer 25 and a control unit 240. In one embodiment, the control unit 240 is configured to generate the driving signal SH and the driving signal SL according to the input voltage VIN (through VAUX) and the feedback signal VFB. The timer 25 is configured to operably generate the aforementioned skipping cycle period Tx.

As shown in FIG. 7, in one embodiment, the timer 25 receives information related to the output power to determine whether the output power is lower than a predetermined threshold or not. When the output power is judged to be lower than the predetermined threshold, the timer 25 starts to count the skipping cycle period Tx and controls the control unit 240 to skip the pulses of the driving signal SH and the driving signal SL during the skipping cycle period Tx.

Please refer back to FIG. 4. During middle load and light load conditions of the resonant half-bridge flyback power converter, the period of the resonant cycle of t4-t5 is short, it may not generate the sufficient negative current (energy) to achieve the ZVS. Therefore, the major part of the negative current will be relied on the current generated in the cycle of t5-t6.

However, a high negative current will cause a higher power loss. In order to control a proper level of the negative current for ZVS, an accurate demagnetized time control is needed. Thus, it is required to generate a demagnetized signal Sdmg correlated to the demagnetized time TDS of the transformer 10.

Figure 8:
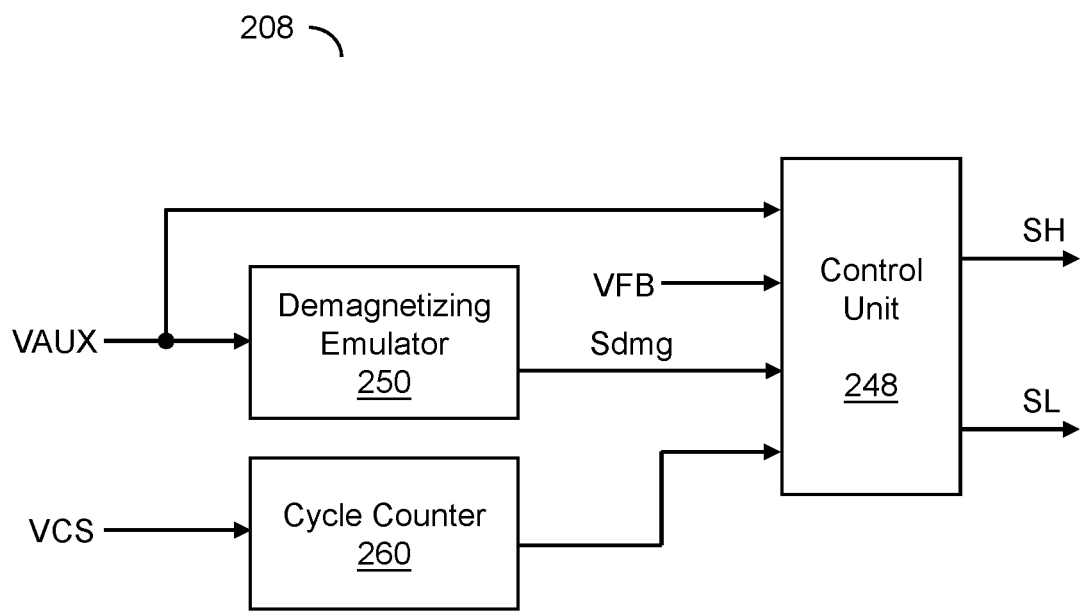
FIG. 8 shows a block diagram of one embodiment of the primary-side controller of the resonant half-bridge flyback power converter according to the present invention.

FIG. 8 shows a block diagram of one embodiment of the primary-side controller of the resonant half-bridge flyback power converter according to the present invention. In one embodiment, the primary-side controller 208 includes a demagnetizing emulator 250 and a control unit 248. In one embodiment, the control unit 248 is configured to generate the driving signal SH and the driving signal SL according to the input voltage VIN (e.g. through VAUX) and the feedback signal VFB. The demagnetizing emulator 250 is configured to generate a demagnetized signal Sdmg for emulating the demagnetized time TDS according to a demagnetizing related signal, such as a reflected voltage (e.g. through VAUX) of the transformer 10.

Figure 9:
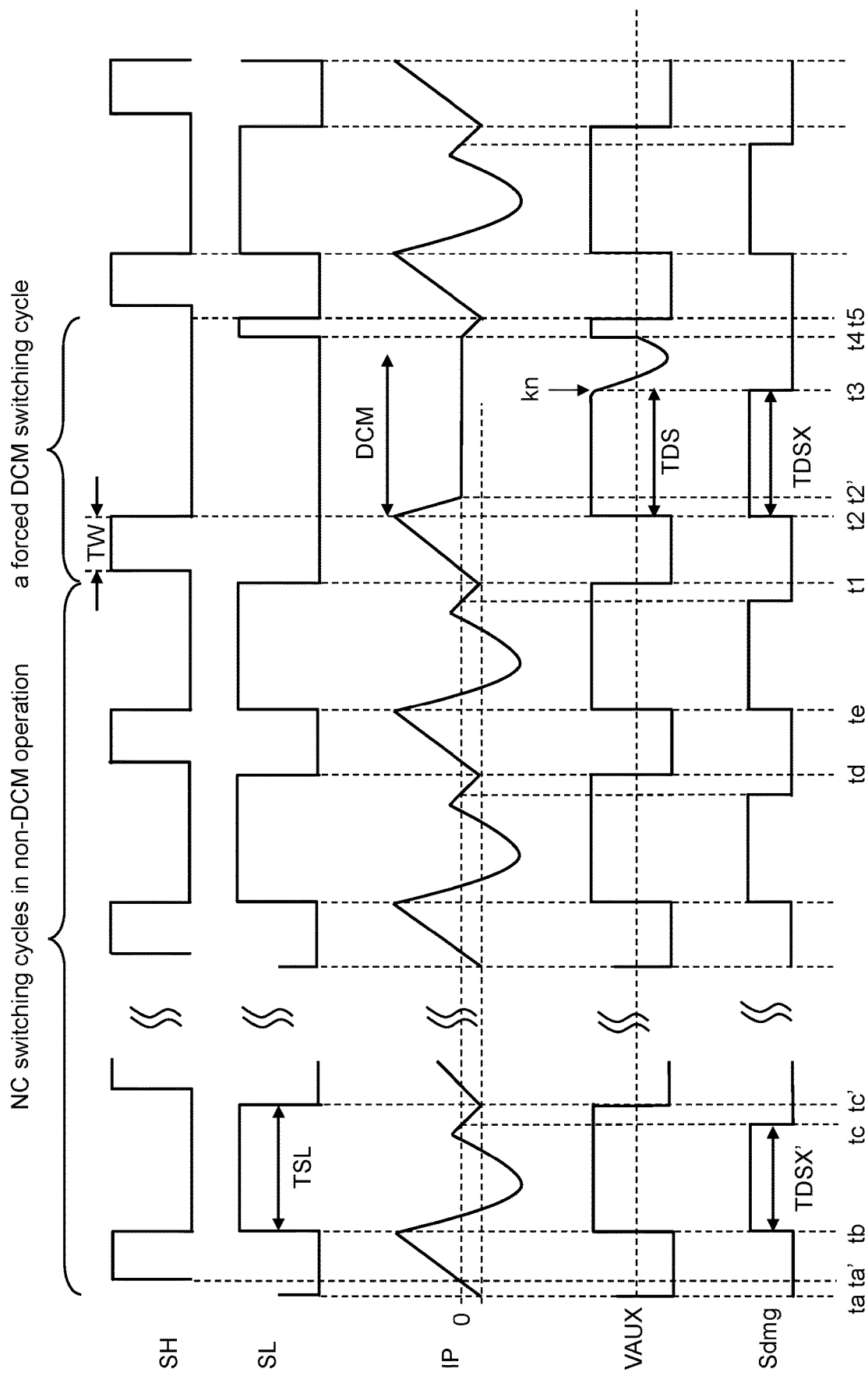
FIG. 9 shows operating waveforms of the demagnetizing emulator for generating the demagnetized signal Sdmg according to the present invention.

Also refer to FIG. 9 which shows operating waveforms of the demagnetizing emulator for generating the demagnetized signal Sdmg according to the present invention.

During a switching cycle wherein the resonant half-bridge flyback power converter is periodically operated in a non-DCM operation (e.g. ta-tc'), the driving signal SH firstly turns on the first transistor 30 to magnetize the transformer 10 for generating the primary switching current IP (e.g. ta'-tb). After the first transistor 30 is turned off, the driving signal SL turns on (e.g. tb-tc') the second transistor 40 for a resonant cycle (tb-tc), and for generating a circulated current (e.g. tc-tc') to achieve ZVS of the first transistor 30. During a switching cycle in a non-DCM operation, the on period TSL (e.g. tb-tc') of the driving signal SL is determined by the pulse width (e.g. TDSX') of the demagnetized signal Sdmg generated by the demagnetizing emulator 250 according to the calibration during a previous deliberately inserted DCM operation. In one embodiment, the on period TDSX' of the demagnetized signal Sdmg, which is calibrated in a previous actively forced DCM operation, is provided to the control unit 248 to control the minimum on time of the second transistor 40 for demagnetizing the transformer 10 after the turn-off of the first transistor 30 during the non-DCM operation. In one embodiment, as shown in FIG. 9, the on period TSL (e.g. tb-tc') of the driving signal SL can be the on period TDSX' of the demagnetized signal Sdmg plus a delay time (e.g. tc-tc'), so as to establish the negative circulated current on the primary current IP after the demagnetized period for achieving ZVS of the first transistor 30.

Note that non-DCM is referred to as an operation mode which is not DCM, such as CCM (continuous conduction mode) or QRM (quasi-resonant mode) operation, wherein QRM is also known as BCM (boundary conduction mode).

In one embodiment, once the primary switching current IP has been operated in a non-DCM operation (e.g. quasi-resonant mode) for over a predetermined number (e.g. NC, a positive integer) of switching cycles (e.g. ta-t1), at least one switching cycle is actively forced to operate in DCM operation (e.g. t1-t3). Thus, the demagnetizing emulator 250 can calibrate the period TDSX of the demagnetized signal Sdmg according to the demagnetized time TDS of the transformer 10 during the deliberately inserted DCM operation.

As shown in FIG. 9, during the deliberately inserted DCM operation, the demagnetized time TDS of the transformer 10 is started from the rising edge of the auxiliary signal VAUX to the falling edge (i.e. knee point kn) of the auxiliary signal VAUX (i.e. t2-t3). More specifically, in this embodiment, the reflected voltage can be detected by sensing the auxiliary signal VAUX from the auxiliary winding NA of the transformer 10 during a switch-off period the first transistor 30. The period of the reflected voltage, i.e. the pulse width of the auxiliary signal VAUX from the rising edge to the knee point kn, is related to the demagnetized time TDS of the transformer 10.

In one embodiment, the primary-side controller 208 further includes a cycle counter 260 which is configured to count the switching cycles operating in non-DCM operation according to the primary switching current IP, and to control the control unit 248 to actively force the DCM operation when the primary switching current IP is determined not operated in DCM over a predetermined number of switching cycles. In one embodiment, the cycle counter 260 can determine a non-DCM operation by sensing the primary switching current IP through the current sensing signal VCS.

In one embodiment, as shown in FIG. 9, during the forced DCM switching cycle, the driving signal SL keeps controlling the second transistor 40 to be off such that the half-bridge circuit operates not only in DCM operation, but also in asynchronous switching mode, wherein a portion of the demagnetized current (e.g. IP from t2-t2') of the transformer 10 flows through the body diode 45 of the second transistor 40 during the forced DCM switching cycle.

Still referring to FIG. 9, the first pulse of the driving signal SL after DCM (e.g. t4-t5) turns on the second transistor 40 to magnetize the transformer 10 from the resonant capacitor 20 to the transformer 10 and to generate a negative circulated current (e.g. IP during t4-t5) that achieves ZVS for the first transistor 30.

Figure 10:
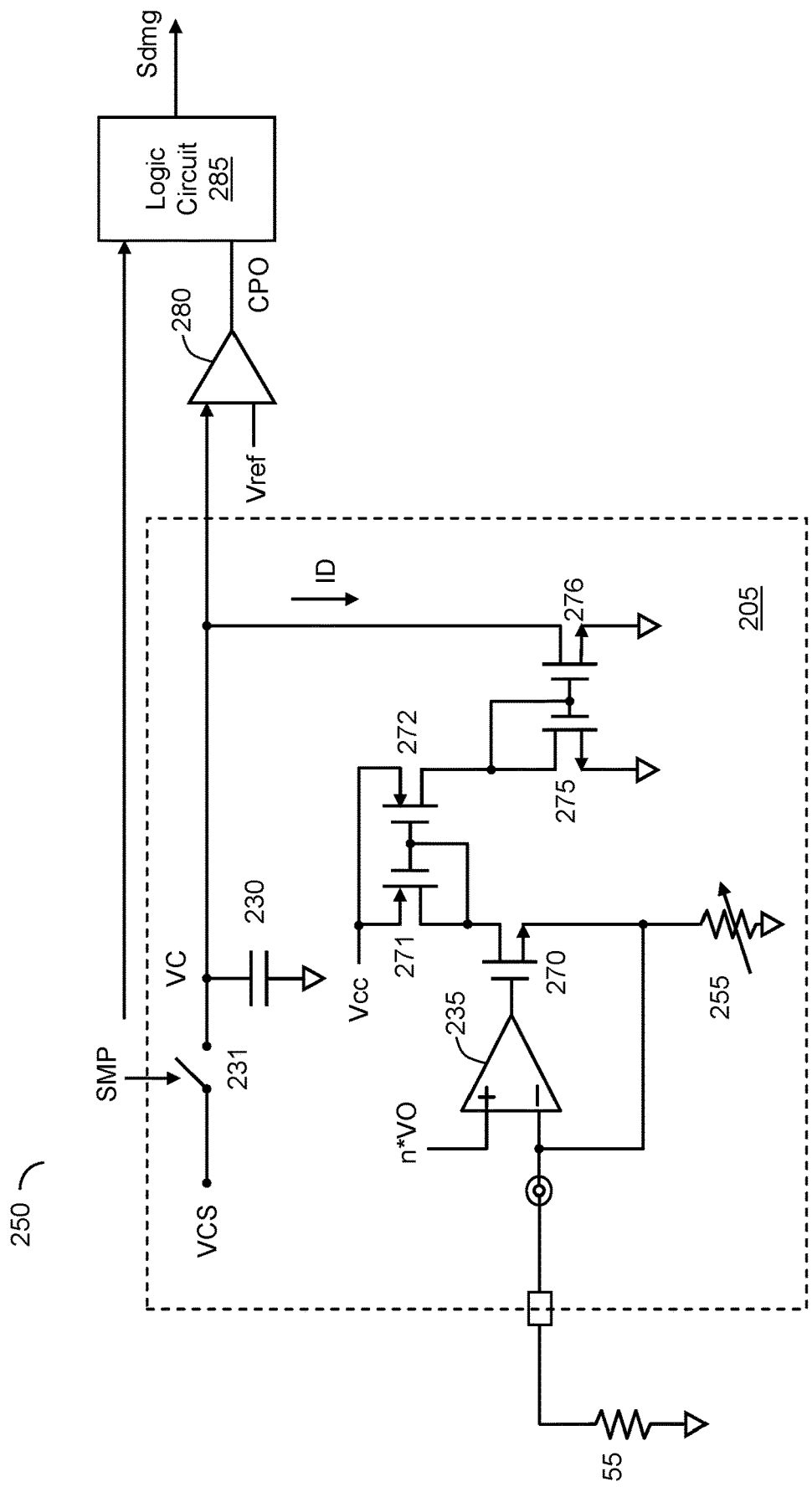
FIG. 10 shows a schematic diagram of one specific embodiment of the demagnetizing emulator that generates the demagnetized signal according to the present invention.

FIG. 10 shows a schematic diagram of one specific embodiment of the demagnetizing emulator that generates the demagnetized signal Sdmg. In one embodiment, the demagnetizing emulator 250 includes a timing generator 205, a comparator 280 and a logic circuit 285.

In one embodiment, the timing generator 205 includes an integrator formed by a switch 231 and a capacitor 230. The switch 231 is controlled by a sampling signal SMP that is correlated to the first signal SH for sampling a current sense signal VCS. A discharging current ID related to n*VO is configured to discharge a voltage VC across the capacitor 230. The voltage VC is compared to a reference voltage Vref by the comparator 280. The logic circuit 285 generates the demagnetized signal Sdmg according to the comparison output CPO and the sampling signal SMP that is correlated to the first signal SH. In one embodiment, the reference voltage Vref is 0V, provided the current sense voltage VCS is 0V when the primary switching current IP is 0.

In one embodiment, the period of the demagnetized signal Sdmg is correlated to the level (Vinx) of the input voltage of the transformer 10 (i.e. the voltage on the node NNP where the primary winding NP being coupled to the resonant capacitor 20 as shown in FIG. 3), the level of the output voltage (e.g. n*VO) of the transformer 10 and the magnetized period (TW) of the transformer 10 during the on period of the first transistor 30. Note that the level Vinx of the input voltage of the transformer 10 is equal to the input voltage VIN subtracted from the cross voltage Vcr of the resonant capacitor 20.

Equation 1 is derived according to the equality between the magnet flux demagnetized of the transformer 10 and the magnet flux magnetized of the transformer 10 as the following:

$$Vinx * TW = N * VO * TDS \qquad \text{(Eq. 1)}$$

where TW is the period of the voltage Vinx applied on the transformer 10 during the magnetizing period of the transformer 10; n*VO is the voltage applied to the transformer 10 during the demagnetized time TDS of the transformer 10. The number n is the turn ratio of the primary winding NP and the secondary winding NS. VO is the voltage of the secondary winding NS (i.e. the output voltage).

After the transformer 10 is magnetized, the level VCSp of the current sense signal VCS, which is related to the peak of the primary switching current IP at the end of magnetization and is generated on a resistor 60 as shown in FIG. 3, can be derived as equation 2:

$$VCSp = (Vonx/L) * TW * Rs \qquad \text{(Eq. 2)}$$

where L is the inductance of the primary winding NP of the transformer 10, Rs is the resistance of the resistor 60, and VCSp is the voltage level at the end of the magnetization of the transformer 10.

Let ID=n*VO/Rt; where Rt is the resistance of the resistor 55.

The pulse width TDSX of the demagnetized signal Sdmg can be derived as:

$TDSX = (C * VCSp)/ID$; where $C$ is the capacitance of the capacitor 230.

$TDSX = (Rt * C * VCSp)/(n * VO)$ $TDSX = (Rt * C/(n * VO)) * (Rs/L) * Vinx * TW$ $$\text{Set } Rt = L/(Rs * C) \qquad \text{(Eq. 3)}$$

$$TDSX = (Vinx * TW)/(n * VO) \qquad \text{(Eq. 4)}$$

Once the equation 3 is satisfied, the period TDSX of the demagnetized signal Sdmg shown in the equation 4 is equal to the demagnetized time TDS of the transformer 10.

Still referring to FIG. 10, the switch 231 is turned on for sampling the current sense signal VCS to the capacitor 230, and the level VCSp of the current sense signal VCS is held on the capacitor 230 at the turn-off of the switch 231 (i.e. the end of magnetizing). The switch 231 is controlled by the sampling signal SMP. The demagnetized signal Sdmg is enabled (for example by the logic circuit 285) when the switch 231 is turned off. In other words, the voltage VC of the capacitor 230 at the start of the demagnetized signal Sdmg is the peak of the current sense signal VCS. After the the switch 231 is turned off, the current ID starts to discharge the capacitor 230. The demagnetized signal Sdmg is disabled when the capacitor 231 is fully discharged (VC=0V) by the discharging current ID (where ID=n*VO/Rt). The resistor 55, as shown in FIG. 10 and FIG. 3, is configured for setting a predetermined pulse width of the demagnetized signal Sdmg.

In one embodiment, during the deliberately inserted DCM switching cycle, the pulse width TDSX of the demagnetized signal Sdmg can be compared to the demagnetized time TDS indicated by the pulse width of the auxiliary signal VAUX by the demagnetizing emulator 250. Thus, the pulse width TDSX of the demagnetized signal Sdmg can be calibrated for use in the coming non-DCM switching cycles. In one embodiment, the demagnetizing emulator 250 further adjusts the resistance of the resistor 255 according to the demagnetized time TDS detected during the DCM operation to calibrate the period TDSX of the demagnetized signal Sdmg.

In other embodiments, other than adjusting the resistor 255, the demagnetizing emulator 250 can be configured to calibrate the period TDSX of the demagnetized signal Sdmg by adjusting the threshold voltage Vth for determining the end of the demagnetized signal Sdmg, or by adjusting the capacitance of the capacitor 230, or by adjusting the ratio of the current mirror circuit for example formed by the transistors 271 and 272 as shown in FIG. 10.

Figure 11:
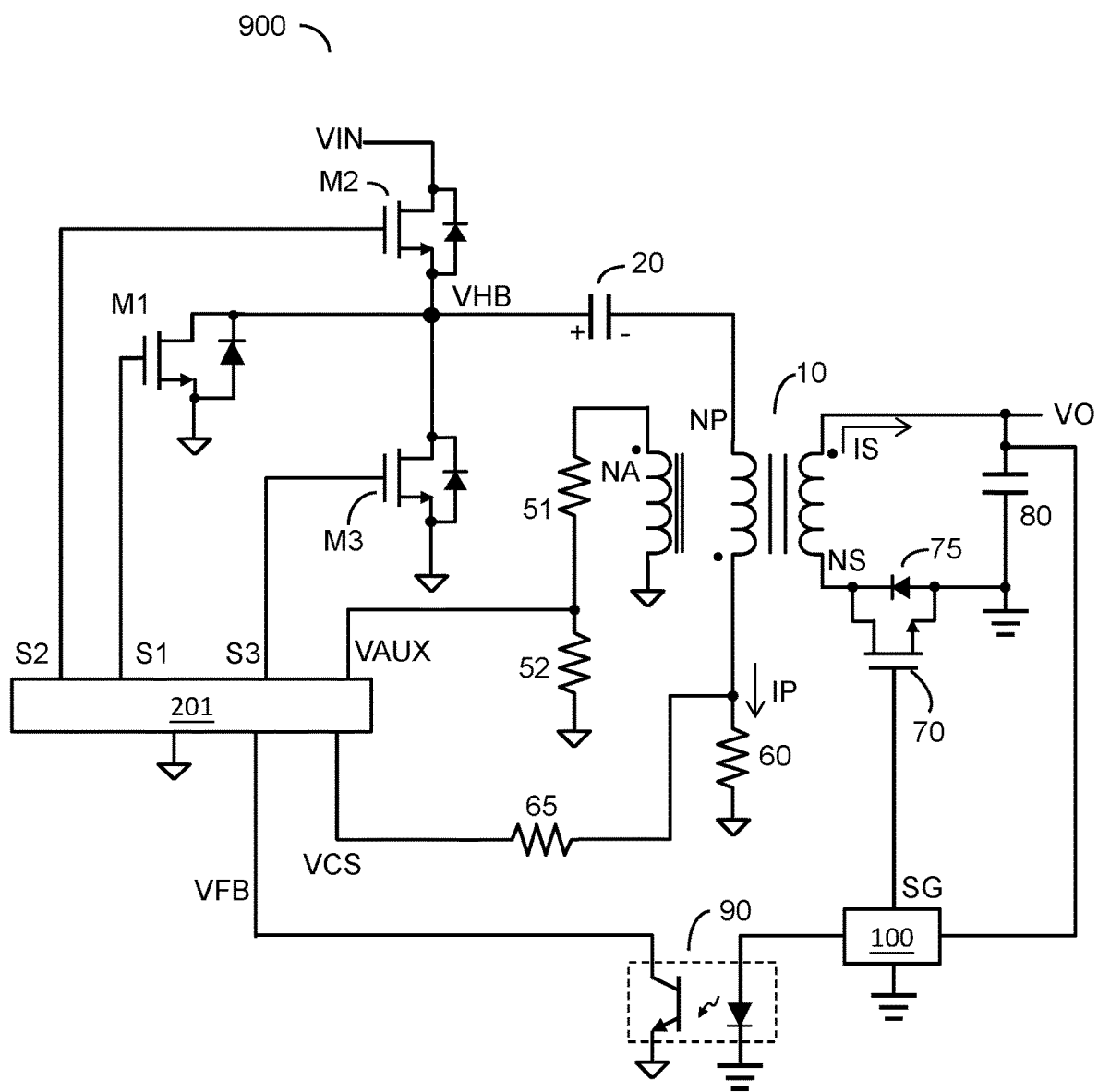
FIG. 11 shows a preferred embodiment of the resonant half-bridge flyback power converter according to the present invention.

FIG. 11 shows a preferred embodiment of the resonant half-bridge flyback power converter according to the present invention. The resonant half-bridge flyback power converter 900 is similar to the resonant half-bridge flyback power converter 300. In this embodiment, the resonant half-bridge flyback power converter 900 includes a first transistor M1, a second transistor M2 and a third transistor M3 which are configured to form a half-bridge circuit. From a perspective, the first transistor M1 and the third transistor M3 are configured as low-side transistors of the half-bridge flyback power converter 900, and the second transistor M2 is configured as a high-side transistor of the half-bridge flyback power converter 900.

According to a feedback signal VFB and the input voltage VIN, a primary-side controller 201 generates a first driving signal S1, a second driving signal S2 and a third driving signal S3 coupled to switch the transformer 10 through the half-bridge circuit for generating an output voltage VO at the secondary-side of the transformer 10. The second driving signal S2 drives the second transistor M2 to magnetize the transformer 10. The third driving signal S3 turns on the third transistor M3 during demagnetizing and the resonant period of the transformer 10. The third driving signal S3 also is applied to turn on the third transistor M3 for generating the circulated current through the transformer 10 and achieving ZVS for the second transistor M2 during the heavy load condition. In other words, the second transistor M2 is the primary high side switch of the resonant half-bridge flyback power converter 900 and can be corresponded to the transistor 30 in FIG. 3. The third transistor M3 is the primary low side switch of the resonant half-bridge flyback power converter 900 and can be corresponded to the transistor 40 in FIG. 3. From one perspective, the first transistor M1 is configured as an auxiliary primary low side switch in parallel with the transistor M3, with an independent control signal S1.

In one embodiment, during the DCM operation in light load condition, after the transformer 10 is magnetized by turning on the second transistor M2, the third transistor M3 is controlled to be on during demagnetizing and the resonant period of the transformer 10. After demagnetizing, the first driving signal S1 is applied to turn on the first transistor M1, while the third transistor M3 being kept off, for generating the circulated current through the transformer 10 and achieving ZVS for the second transistor M2. Therefore, the third transistor M3 will not switch twice during one switching cycle during DCM.

Since the first transistor M1 is configured for generating the circulated current for ZVS only, in one embodiment, the physical size (e.g. the ratio of the width to the length) of the first transistor M1 can be configured much smaller than the physical size of the third transistor M3. Therefore, the driving capability and the parasitic capacitance (for example gate capacitance) of the first transistor M1 is lower than the parasitic capacitance of the third transistor M3. The switching loss of first transistor M1 is thus lower than the switching loss of the third transistor M3.

For example, the gate switching loss Pg of a transistor can be expressed as:

$$Pg = 0.5 * Ciss * Vg * Vg * Freq$$

where Ciss is the input capacitance of the transistor. Vg is the voltage level of the gate driver signal. Freq is the switching frequency of the gate driving signal.

From the switching power loss equation as above, the gate switching loss of the first transistor M1 having a smaller physical size, which is dedicated for achieving ZVS for the second transistor M2 during the DCM, is lower than that of the third transistor M3 having a larger physical size.

In addition, in one embodiment, an amplitude of the voltage level (i.e. Vg) of the first driving signal S1 is lower than an amplitude of the voltage level of the third driving signal S3, which can further reduce switching loss of the first transistor M1. Furthermore, in one embodiment, a gate related maximum rating (e.g. gate-source voltage) of the first transistor M1 can be lower than that of the third transistor M3.

A resistor 60 is coupled to generate a current sense signal VCS by detecting a primary switching current IP of the power transformer 10. The primary-side controller 201 generates the first driving signal S1 according to the input voltage VIN, and generates the third driving signal S3 according to the input voltage VIN and/or the output voltage VO. The primary-side controller 201 further generates the second driving signal S2 according to the feedback signal VFB.

Figure 12:
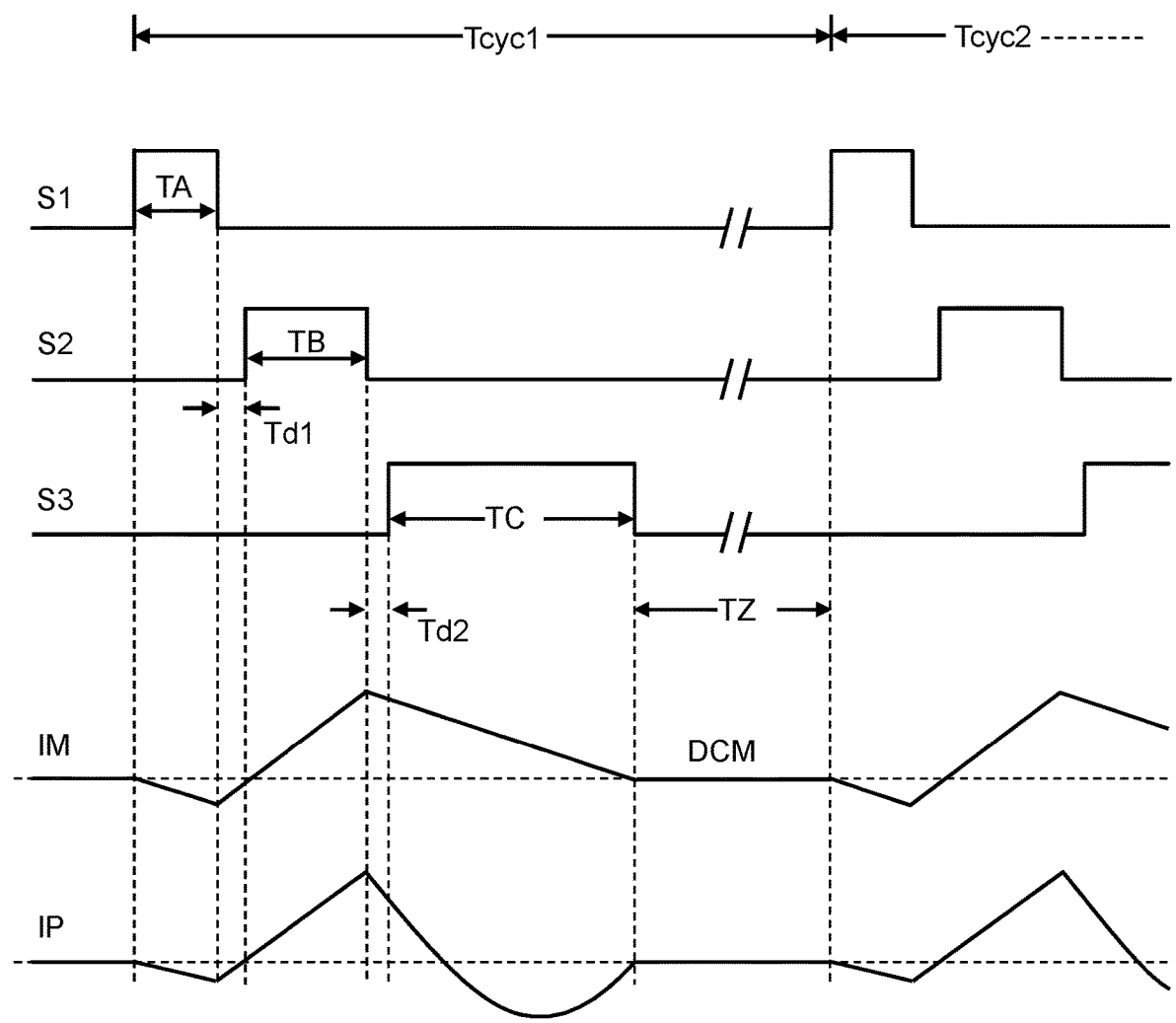
FIG. 12 shows operating waveforms of one preferred embodiment of the primary-side controller 201 operating in DCM operation according to the present invention.

FIG. 12 shows operating waveforms of one preferred embodiment of the primary-side controller 201 operating in DCM operation according to the present invention. During the DCM operation, the primary-side controller 201 operates in a first switching cycle Tcyc1 and controls the first driving signal S1 to turn on the first transistor M1 with a first period TA for generating the circulating current that will achieve ZVS for the turn-on of the second transistor M2. After the first period TA, the first driving signal S1, the second driving signal S2 and the third driving signal S3 are controlled to turn off the first transistor M1, the second transistor M2 and the third transistor M3 for a first off-time period Td1 (i.e. a dead time). In one embodiment, the first off-time period Td1 is related to a quasi-resonant period for achieving ZVs of the second transistor M2. After the first off-time period Td1, the second driving signal S2 controls the second transistor M2 to turn on for a second period TB. The turn-on of the second transistor M2 is applied to magnetize the transformer 10. After the second period TB, the first driving signal S1, the second driving signal S2 and the third driving signal S3 are configured to turn off the first transistor M1, the second transistor M2 and the third transistor M3 for a second off-time period Td2 (i.e. a dead time). The second off-time period Td2 is related to another quasi-resonant period for achieving ZVS of the third transistor M3. After the second off-time period Td2, the third driving signal S3 controls the third transistor M3 to turn on for a third period TC. The third transistor M3 is turned on during the demagnetizing period of the transformer 10. After the third period TC, the first driving signal S1, the second driving signal S2 and the third driving signal S3 are configured to turn off the first transistor M1, the second transistor M2 and the third transistor M3 for a third off-time period TZ, wherein the magnetizing current IM stays at zero (i.e. DCM) during the third off-time period TZ. After the third off-time period TZ, another switching cycle Tcyc2 starts.

Figure 13:
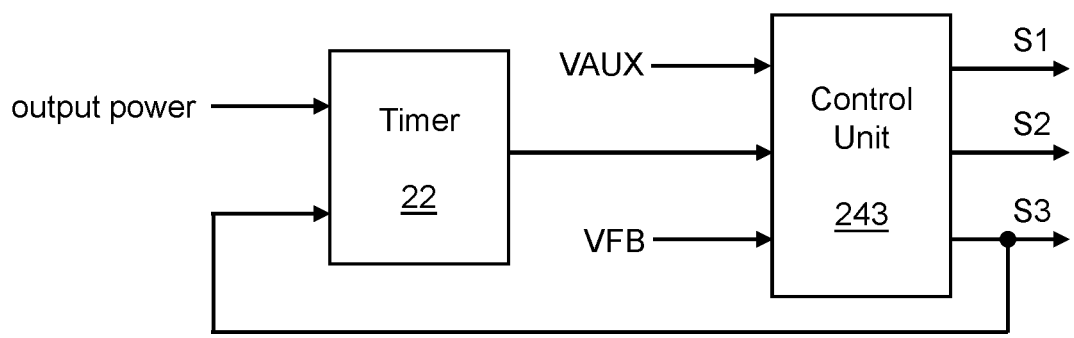
FIG. 13 shows a block diagram of a preferred embodiment of the primary-side controller according to the present invention.

FIG. 13 shows a block diagram of a preferred embodiment of the primary-side controller according to the present invention. In one embodiment, the primary-side controller 213 includes a timer 22 and a control unit 243. The control unit 243 is configured to generate the first driving signal S1, the second driving signal S2 and the third driving signal S3 according to the input voltage VIN (through VAUX) and the feedback signal VFB.

The timer 22 is configured to time to generate the third off-time period TZ, which is triggered by the end (e.g. the falling edge) of the pulse of the third driving signal S3. In one embodiment, the third off-time period TZ is increased in response to the decrease of output power of the flyback power converter. Therefore, the switching frequency of the flyback power converter can be decreased in response to the decrease of the output power of the flyback power converter for improving the efficiency in light load operation.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant half-bridge flyback power converter comprising:
a first transistor and a second transistor which are configured to form a half-bridge circuit connected between an input voltage and a ground potential;
a transformer, wherein a primary winding of the transformer and a resonant capacitor are connected in series to form a resonant tank, wherein the resonant tank is switched between the input voltage and the ground potential by the half-bridge circuit so as to resonate during both magnetizing and demagnetizing of the transformer for converting the input voltage to an output voltage; and
a switching control circuit configured to operably generate a first driving signal and a second driving signal to control the first transistor and the second transistor respectively;
wherein the first driving signal is configured to magnetize the transformer;
wherein the second driving signal includes at most one pulse between two consecutive pulses of the first driving signal, wherein the at most one pulse of the second driving signal includes either a resonant pulse for operating a resonant cycle for demagnetizing after the transformer is magnetized or a ZVS (zero voltage switching) pulse for achieving ZVS of the first transistor, wherein a primary switching current flowing through both the primary winding and the resonant capacitor and a secondary switching current flowing through a secondary winding of the transformer have an at least partially resonating sine- wave form during the resonant cycle;
wherein the switching control circuit includes a timer configured to operably generate a skipping cycle period when an output power corresponding to the output voltage is lower than a predetermined threshold; wherein a resonant pulse corresponding to the resonant cycle of the second driving signal is skipped during the skipping cycle period; wherein the second transistor is turned on for a ZVS pulse after the skipping cycle period for achieving ZVS of the first transistor; wherein the skipping cycle period is increased in response to the decrease of the output power.

2. The resonant half-bridge flyback power converter of claim 1, wherein the second driving signal does not include a second pulse for achieving ZVS of the first transistor between two consecutive pulses of the first driving signal when an output power is lower than the predetermined threshold.

3. The resonant half-bridge flyback power converter of claim 1, each of the first driving signal and the second driving signal includes zero pulses during the skipping cycle period.

4. The resonant half-bridge flyback power converter of claim 1, wherein a period of the resonant pulse of the second driving signal is equal to or longer than a demagnetizing period of the transformer.

5. The resonant half-bridge flyback power converter of claim 1, wherein a portion of a demagnetized current of the transformer flows through a body diode of the second transistor after turning off the first transistor during the skipping cycle period.

6. The resonant half-bridge flyback power converter of claim 1, the first driving signal includes at most one pulse between two consecutive pulses of the second driving signal when an output power is lower than the predetermined threshold.

7. The resonant half-bridge flyback power converter of claim 1, wherein each pulse of the second driving signal is followed by a pulse of the first driving signal.

8. The flyback resonant half-bridge power converter of claim 1, wherein the skipping cycle period is started from a turn-off time point of the first driving signal when the output power is lower than the predetermined threshold.

9. The resonant half-bridge flyback power converter of claim 1, wherein the skipping cycle period is started from a turn-off time point of the first driving signal, and the second driving signal turns on a ZVS pulse when the skipping cycle period is expired.

10. A control method for controlling a resonant half-bridge flyback power converter, wherein the resonant half-bridge flyback power converter includes a first transistor and a second transistor which are configured to form a half-bridge circuit connected between an input voltage and a ground potential; and a transformer, wherein a primary winding of the transformer and a resonant capacitor are connected in series to form a resonant tank, wherein the resonant tank is switched between the input voltage and the ground potential by half-bridge circuit SO as to resonate during the both magnetizing and demagnetizing of the transformer for converting the input voltage to an output voltage; the resonant half-bridge flyback power converter comprising:
  switching the transformer with periodical switching cycles to generate an output voltage by switching the half-bridge circuit;
  generating a skipping cycle period when an output power corresponding to the output voltage is lower than a predetermined threshold;
  wherein the switch-on of the first transistor magnetizes the transformer; the switch-on of the second transistor achieves either a resonant cycle for demagnetizing or achieves ZVS for the first transistor, wherein a primary switching current flowing through both the primary winding and the resonant capacitor and a secondary switching current flowing through a secondary winding of the transformer have an at least partially resonating sine-wave form during the resonant cycle;
  wherein a resonant pulse corresponding to the resonant cycle of the second driving signal is skipped during the skipping cycle period; wherein the second transistor is turned on for a ZVS pulse after the skipping cycle period for achieving ZVS of the first transistor; wherein the skipping cycle period is increased in response to the decrease of the output power.

11. The control method of claim 10, wherein a period of the resonant cycle of the second transistor is equal or longer than a demagnetizing period of the transformer.

12. The control method of claim 10, wherein a portion of a demagnetized current of the transformer flows through a body diode of the second transistor after turning off the first transistor during the skipping cycle period.

13. The control method of claim 10, wherein a switch-off of the second transistor is followed by a switch-on of the first transistor.

* * * * *